US012594516B2

(12) United States Patent
Mok

(10) Patent No.: US 12,594,516 B2
(45) Date of Patent: Apr. 7, 2026

(54) FRAME FOR COLLAPSIBLE AND FOLDABLE PLEATED DISPOSABLE AIR FILTER WITH DIFFERENTIAL PRESSURE SENSOR AND COMMUNICATION CAPABILITY

(71) Applicant: Woosh Air Inc., San Francisco, CA (US)

(72) Inventor: Winston Mok, San Francisco, CA (US)

(73) Assignee: WOOSH AIR INC., San Francisco, CA (US)

( * ) Notice: Subject to any disclaimer, the term of this patent is extended or adjusted under 35 U.S.C. 154(b) by 651 days.

(21) Appl. No.: 17/674,626

(22) Filed: Feb. 17, 2022

(65) Prior Publication Data

US 2023/0201751 A1 Jun. 29, 2023

Related U.S. Application Data

(60) Provisional application No. 63/265,958, filed on Dec. 23, 2021.

(51) Int. Cl.
| | |
|---|---|
| *B01D 46/44* | (2006.01) |
| *B01D 46/00* | (2022.01) |
| *B01D 46/52* | (2006.01) |

(52) U.S. Cl.
CPC ..... *B01D 46/0016* (2013.01); *B01D 46/0004* (2013.01); *B01D 46/0015* (2013.01);
(Continued)

(58) Field of Classification Search
CPC ............ B01D 46/0016; B01D 46/0004; B01D 46/0015; B01D 46/0086; B01D 46/446;
(Continued)

(56) References Cited

U.S. PATENT DOCUMENTS

| | | | | |
|---|---|---|---|---|
| 4,312,645 | A | * | 1/1982 | Mavros ................... B01D 46/10 |
| | | | | 96/400 |
| 4,610,703 | A | * | 9/1986 | Kowalczyk .......... B60H 3/0608 |
| | | | | 116/DIG. 25 |

(Continued)

OTHER PUBLICATIONS

U.S. Appl. No. 18/816,952, filed Aug. 27, 2024, William Mark Dodd, Air Sensor Tube Design for Improved Measurement Accuracy and Reduction of Dust Related Degradation.

*Primary Examiner* — Dung H Bui
(74) *Attorney, Agent, or Firm* — NIXON PEABODY LLP

(57) ABSTRACT

A frame for a foldable and disposable air filter media is disclosed. The frame has a frame base and a frame cover having a size to overlap the air filter media. The frame cover is attached to the frame base by hinges allowing movement of the frame cover between an open position and a closed latched position. The closed frame holds the air filter media between the frame base and frame cover when in the closed position. The frame base includes an air flow monitoring system with an air pressure differential sensor to determine when the filter needs to be replaced. The frame also has capability to hold additional sensors for monitoring environmental conditions. A processor and memory enable collection and storage of sensed data. A communication module on the frame communicates air filter media change requirement to external devices including hand-held devices or a cloud server.

26 Claims, 7 Drawing Sheets

(52) U.S. Cl.
 CPC ....... *B01D 46/0086* (2013.01); *B01D 46/446*
   (2013.01); *B01D 46/521* (2013.01); *B01D*
   *2265/023* (2013.01); *B01D 2265/028*
   (2013.01); *B01D 2279/50* (2013.01)

(58) Field of Classification Search
 CPC ............ B01D 46/521; B01D 2265/023; B01D
   2265/028; B01D 2279/50; B01D 46/448;
   B01D 46/10; B01D 46/0002; B01D
   46/429
 See application file for complete search history.

(56) References Cited

U.S. PATENT DOCUMENTS

| | | | | |
|---|---|---|---|---|
| 4,747,364 | A | * | 5/1988 | Horowitz ................ G01L 19/12 |
| | | | | 116/DIG. 25 |
| 4,786,295 | A | * | 11/1988 | Newman ............. B01D 46/446 |
| | | | | 55/471 |
| 5,009,225 | A | | 4/1991 | Vrabel |
| 5,217,513 | A | * | 6/1993 | Armbruster ........... B01D 46/42 |
| | | | | 96/414 |
| 5,240,478 | A | | 8/1993 | Messina |
| 5,464,461 | A | * | 11/1995 | Whitson ............ H05K 7/20181 |
| | | | | 55/504 |
| 5,766,285 | A | * | 6/1998 | Killman ............. B01D 46/0016 |
| | | | | 55/501 |
| 5,795,361 | A | * | 8/1998 | Lanier, Jr. ............ B01D 46/521 |
| | | | | 55/497 |
| 5,843,198 | A | | 12/1998 | Walker |
| 6,030,427 | A | * | 2/2000 | Sorice ..................... B01D 46/10 |
| | | | | 55/DIG. 35 |
| 6,398,835 | B1 | | 6/2002 | Rehil |
| 8,021,618 | B1 | | 9/2011 | Cooper |
| 8,231,716 | B2 | * | 7/2012 | Poon .................. B01D 46/0086 |
| | | | | 96/418 |
| 8,744,780 | B2 | * | 6/2014 | Wilson, Jr. ............ G01N 21/59 |
| | | | | 702/33 |
| D725,254 | S | * | 3/2015 | Roblin ......................... D23/365 |
| 9,593,861 | B1 | | 3/2017 | Burnett |
| 10,307,703 | B1 | * | 6/2019 | Dearden .............. B01D 46/121 |
| 10,603,616 | B1 | * | 3/2020 | Nance ............... B01D 46/0002 |
| D950,698 | S | * | 5/2022 | Ramphal ..................... D23/365 |
| 11,865,482 | B2 | * | 1/2024 | Kluck ................. B01D 46/444 |
| 2003/0183085 | A1 | * | 10/2003 | Alexander ......... B01D 46/0086 |
| | | | | 96/421 |
| 2003/0205039 | A1 | * | 11/2003 | Terlson ................ B01D 46/521 |
| | | | | 55/497 |
| 2004/0182245 | A1 | * | 9/2004 | Gorin ................ B01D 46/0086 |
| | | | | 116/271 |
| 2005/0138906 | A1 | * | 6/2005 | Kubokawa .......... B01D 46/523 |
| | | | | 55/497 |
| 2007/0140924 | A1 | | 6/2007 | Hill |
| 2008/0148698 | A1 | * | 6/2008 | Nowak ............. B01D 46/0016 |
| | | | | 55/493 |
| 2009/0007528 | A1 | * | 1/2009 | Wilson .................. B64D 33/02 |
| | | | | 55/306 |
| 2009/0199526 | A1 | * | 8/2009 | Wallace ................ B01D 46/10 |
| | | | | 29/270 |
| 2009/0249957 | A1 | | 10/2009 | Lackey, Sr. |
| 2009/0261208 | A1 | * | 10/2009 | Belyew .................. B01D 46/10 |
| | | | | 55/306 |
| 2010/0288468 | A1 | * | 11/2010 | Patel ........................ F24F 11/46 |
| | | | | 165/59 |
| 2011/0005177 | A1 | * | 1/2011 | Pfannenberg ......... F04D 29/703 |
| | | | | 55/385.1 |
| 2012/0125592 | A1 | | 5/2012 | Fadell et al. |
| 2012/0318073 | A1 | * | 12/2012 | Zavodny ............... B01D 46/42 |
| | | | | 73/862.581 |
| 2014/0260984 | A1 | * | 9/2014 | Morgan ............ B01D 46/0086 |
| | | | | 95/287 |
| 2015/0013287 | A1 | * | 1/2015 | Yamaguchi ........ B01D 46/0002 |
| | | | | 55/497 |
| 2015/0052978 | A1 | * | 2/2015 | Beier ................. B01D 46/0086 |
| | | | | 73/38 |
| 2015/0101296 | A1 | * | 4/2015 | Ferreira ............ B01D 46/0005 |
| | | | | 55/496 |
| 2015/0277373 | A1 | * | 10/2015 | Yamaguchi ............ B01D 46/10 |
| | | | | 55/495 |
| 2016/0206988 | A1 | * | 7/2016 | Bohrer ................. B01D 46/444 |
| 2016/0243486 | A1 | * | 8/2016 | Galsim ............. B01D 46/0086 |
| 2016/0378057 | A1 | * | 12/2016 | Yamaguchi .......... G03G 21/206 |
| | | | | 55/492 |
| 2017/0128875 | A1 | * | 5/2017 | Prather ................ B01D 46/446 |
| 2017/0266597 | A1 | * | 9/2017 | Winters ............ B01D 46/0005 |
| 2018/0304184 | A1 | * | 10/2018 | Gunnefur ........... B01D 46/2411 |
| 2019/0262754 | A1 | * | 8/2019 | Barry ................... B01D 46/521 |
| 2020/0139289 | A1 | | 5/2020 | Tapper |
| 2020/0256578 | A1 | * | 8/2020 | Meis .................... B01D 46/446 |
| 2020/0338487 | A1 | * | 10/2020 | Chuang ................. B01D 46/10 |
| 2020/0406182 | A1 | * | 12/2020 | Grieve .................. B01D 46/71 |
| 2021/0018247 | A1 | * | 1/2021 | Hanson ................. F25D 17/042 |
| 2021/0063021 | A1 | * | 3/2021 | Salpietra ............. F24C 15/2035 |
| 2021/0095889 | A1 | * | 4/2021 | Park ......................... F24H 9/02 |
| 2021/0106938 | A1 | * | 4/2021 | Zimmerman, III ......................... |
| | | | | B01D 46/0016 |
| 2021/0121816 | A1 | * | 4/2021 | Kim ...................... B01D 46/46 |
| 2021/0197112 | A1 | * | 7/2021 | Barry ................. B01D 46/0016 |
| 2021/0213382 | A1 | * | 7/2021 | Cole ........................ F24F 11/56 |
| 2021/0236682 | A1 | * | 8/2021 | Willette ............. B01D 46/0028 |
| 2021/0252443 | A1 | * | 8/2021 | Ramphal ............ B01D 46/4245 |
| 2021/0346829 | A1 | * | 11/2021 | Chuang .................. F24F 8/108 |
| 2021/0387127 | A1 | * | 12/2021 | Wessels ................ B01D 46/46 |
| 2021/0394108 | A1 | * | 12/2021 | Pietschner ............ B01D 46/58 |
| 2021/0396416 | A1 | * | 12/2021 | Gonia ..................... F24F 11/52 |
| 2022/0001317 | A1 | * | 1/2022 | Zhao ................. B01D 46/0001 |
| 2022/0065494 | A1 | * | 3/2022 | Schempp ................. F24F 8/50 |
| 2022/0072464 | A1 | * | 3/2022 | Simpson Jr. ....... B01D 46/0086 |
| 2022/0082039 | A1 | * | 3/2022 | Ishii ................... B01D 46/0086 |
| 2022/0314152 | A1 | * | 10/2022 | Stender ............... F24C 15/2035 |
| 2022/0323893 | A1 | * | 10/2022 | Nordling ................ B01D 46/12 |
| 2023/0089672 | A1 | | 3/2023 | Mok |
| 2023/0240494 | A1 | * | 8/2023 | Sjöberg .................. B01D 50/20 |
| | | | | 95/19 |
| 2023/0271125 | A1 | * | 8/2023 | Choi ...................... B01D 46/10 |
| | | | | 55/495 |
| 2024/0109016 | A1 | * | 4/2024 | Wu ....................... B01D 46/10 |
| 2024/0399281 | A1 | | 12/2024 | Mok |
| 2025/0001344 | A1 | | 1/2025 | Mok |

\* cited by examiner

FRAME FOR COLLAPSIBLE AND FOLDABLE PLEATED DISPOSABLE AIR FILTER WITH DIFFERENTIAL PRESSURE SENSOR AND COMMUNICATION CAPABILITY

PRIORITY CLAIM

The present disclosure claims priority to and the benefit of U.S. Provisional Application Ser. No. 63/265,958, filed on Dec. 23, 2021. The contents of that application are hereby incorporated by reference in their entirety.

TECHNICAL FIELD

The present disclosure generally relates to a securely closable frame for replaceable air filters for central air systems. Specifically, the present disclosure relates to an air filter frame that may include multiple sensors for measuring environmental characteristics and a sensor for measuring differential pressure across the filter to determine filter change requirements and diagnostics.

BACKGROUND

Heating, ventilation, and air conditioning (HVAC) are air flow systems that have become a common staple in providing indoor comfort in residential and commercial buildings. The overall goal of an HVAC system is to provide thermal comfort, as well as an acceptable indoor air quality that is suitable to breathe. HVAC systems have become an important part of residential structures including single family homes, apartment buildings, hotels, and senior living facilities, medium to large industrial and office buildings such as those in skyscrapers and hospitals, where safe and healthy building conditions are regulated and ensured with respect to air quality including temperature and humidity by using an in-flow of fresh air from outdoors or by combining outdoor air with partial indoor air.

In order to use any quantum of fresh air from the outside, proper ventilation for the buildings must be provided. Ventilation is the process of exchanging or replacing air in any space, to provide high indoor air quality. High air quality, as indicated before, involves temperature control and humidity control, oxygen replenishment, and removal of unwanted odors, smoke, heat, dust, airborne bacteria and virus carriers, and other contaminants and gases from the air available within the space. Ventilation also facilitates the removal of unpleasant smells and excessive moisture by introducing fresh, heated, or cooled outside air to keep interior building air circulating to prevent stagnation of the interior air. Air filters hence form an essential component of the ventilation system. HVAC systems typically have a cooling air system and a warming air system that distribute cooled or heated air respectively through duct work of the buildings as necessary. The air supply intake is filtered through air cleaners and filters, to remove dust, bacteria, and pollen particles. These air filters will have pores for air to flow through. The pores are sufficiently small to prevent the transfer of the unwanted molecules and particulates through the filter material. These molecules and particulates tend to clog the pores of the filter over time and reduce the rate of flow of air through the filter. It is imperative to replace filters to have an efficient filtering system. Failure to replace filters in a system regularly could lead to reduced air exchange and lower heat exchange rate, resulting in wasted energy, shortened equipment or system life, and higher energy bills. In some instances, unclean or dirty air filters that have been kept in the filtering system beyond their lifespan, can cause filtering system overheating or freezing during operation resulting in damage to the filtering system or even cause the filtering system to fail completely.

As discussed, changing filters regularly reduces the strain on the equipment used to circulate the air. The regular changing of filters also helps prolong the life of HVAC systems and reduces overall energy consumption. In addition to providing adequate air flow to protect the equipment, these air filters work to purify the air for the occupants within a residential or commercial setting by removing unwanted polluting contaminants. Filters of increasing efficiency, capable of filtering out smaller size particles and contaminants, have become more popular as consumers have become more aware and interested in indoor air quality (IAQ).

Air filters are found in two groups, one group consisting of pleated types of filters and the second group consisting of non-pleated type filters. The pleated filters allow for more air filter surface area, resulting in higher air flow with a lower pressure drop across the filter, resulting in use of less energy to filter a volume of incoming air. Non-pleated air filters are not suited for continuous use as with home or enterprise ventilation systems. The typical non-pleated filters are used in equipment such as air cleaners and vacuum cleaners that are turned on intermittently. These filters, if disposable, often have a smaller surface area and result in a shorter filter use life while providing results that are less than optimal. These types of non-pleated filters are mainly used where cost is the main concern.

Typical pleated air filters have a rectangular shape that have a standardized length, width, and depth. Pleated air filters may have a cardboard relatively rigid frame that supports the air filter media. The air filter media occupies only a fraction of the total volume of the assembled air filter. In order to reduce the cost of the filter, it has been proposed to use a foldable, disposable, replacement pleated filter. The construction and application of such a filter has been described in a co-pending provisional application (Ser. No. 63/244,052), filed Sep. 14, 2021 the totality of which is herein incorporated by reference.

Since most of the cost of the current filters is due to the structural components required to hold the filter media in place and provide it the needed shape, there is a need for a frame that holds a replaceable filter media. There is a further need for a filter frame that includes an air pressure sensor to provide air pressure differentials from the air filter to determine when the filter should be replaced. There is a further need for a filter frame that can communicate to an external device when a replaceable filter should be replaced.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

An embodiment of the present disclosure relates to a frame for a foldable and disposable air filter media. The frame includes a frame base having a size to overlap the air filter media. The frame includes a frame cover having a size to overlap the air filter media. The frame cover is attached to the frame base allowing movement of the frame cover between an open position and a closed position. The frame base and frame cover hold the air filter media therebetween when in the closed position.

A further implementation of the example frame is an embodiment where edges of the cover provide a seal against supports of the frame base against air leaking around sides of the air filter media. Another implementation is where the frame includes a differential air pressure sensor positioned to provide a differential air pressure measurement across the air filter media. Another implementation is where the frame includes a filter monitoring system coupled to the differential air pressure sensor. The filter monitoring system determines a baseline differential air pressure when the air filter media is initially installed and compares the differential air pressure measurement with the baseline value during an air filtering operation of the air filter media. Another implementation is where the filter monitoring system is operable to provide an alert if the compared measurement exceeds a threshold indicating the air filter media requires replacement. Another implementation is where the filter monitoring system includes a communication module that allows communication of the differential pressure measurement data to at least a cloud based server enabled to alert a user via external device. Another implementation is where the external device comprises at least a hand held device. Another implementation is where the alert to the user is by one of a push notification or an email. Another implementation is where the filter monitoring system includes an activation button that triggers measurement of the differential air pressure during an initial air flow after replacement of the air filter media to determine the baseline differential air flow. Another implementation is where the frame includes a flow sensing switch for activating the filter monitoring system when air flow is forced through the filter. Another implementation is where the frame includes one or more secondary sensors. The secondary sensors are one or more of an absolute air pressure sensor, a temperature sensor, a humidity sensor, a volatile organic compound sensor or air quality sensor. Another implementation is where the differential air pressure sensor is mounted in a lateral support coupled across the base frame. Another implementation is where the frame includes an audible indicator or a visual indicator attached to the support to indicate operational and maintenance status of the filter. The visual indicator comprises one or more sets of LEDs, or other displays. Another implementation is where the frame base and the frame cover are held together in the closed position by one or more closure devices that are chosen from a group comprising magnetic closure devices or mechanical closure devices. Another implementation is where the frame cover and the frame base are injection molded. Another implementation is where the frame includes one or more hinges connecting to the frame cover to the frame base to allow the frame cover to be rotated relative the base frame. Another implementation is where the frame cover includes one or more latching sockets mateable with one or more corresponding latching devices on the frame cover, wherein the latching devices are configured to secure the frame cover on the frame base. Another implementation is where a center support along the length of the frame has a triangular or trapezoidal cross section. Another implementation is where the center support includes one or more magnet members that magnetically contact one or more magnetized members on the frame cover to hold the frame cover and the frame base closed. Another implementation is where the top cover includes a grid of wires that support and retain the filter media in place. Another implementation is where the frame base includes a hexagonal structure to support the air filter media.

Another disclosed example embodiment is an air filter frame base for folding an air filter media with a frame cover. The frame base has a pair of lengthwise supports. One of the lengthwise supports including attachment mechanisms to the frame cover to enclose the air filter media. The frame base has a pair of widthwise supports coupled to the ends of the lengthwise supports. The widthwise and lengthwise supports define the frame base. A cross member is connected between the widthwise supports for supporting the air filter media. A filter monitoring system including an air pressure sensor is mounted on the cross member. The filter monitoring system determines air pressure differential when air flows through the air filter media.

A further implementation of the example frame base is an embodiment where the air pressure sensor is an air pressure differential sensor to sense pressure differential in air flowing through the air filter media from an inlet in a conduit structure at a bottom end of the air filter frame base and an outlet in a top of the air filter frame base. Another implementation is where the filter monitoring system includes a controller that determines a baseline air pressure differential when the air filter is initially installed and compares the air pressure differential measurement during operation with the baseline value to determine when an air filter media replacement is needed. Another implementation is where the filter monitoring system includes an activation button that triggers measurement of the air pressure differential to determine and store the baseline air pressure differential. Another implementation is where the filter monitoring system includes a controller providing an alert if the compared measurement exceeds a threshold that indicates the air filter media needs to be replaced. The filter monitoring system includes a communication module to communicate the filter replacement need to an external device. Another implementation is where the filter monitoring system includes one or more memories for storage of the differential measurement data, maintenance data and environmental and historic data sensed by other sensors included in the air filter frame. Another implementation is where the filter monitoring system includes an air flow sensor that senses air flow through the air filter media and provides power to the controller only when air is flowing. Another implementation is where the base frame includes an audible or a visual indicator to indicate operational and maintenance status of the filter media determined by the controller. Another implementation is where the filter monitoring system includes one or more additional sensors from the group comprising an absolute air pressure sensor, a temperature sensor, a humidity sensor, a volatile organic compound sensor, and an air quality sensor.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1A:
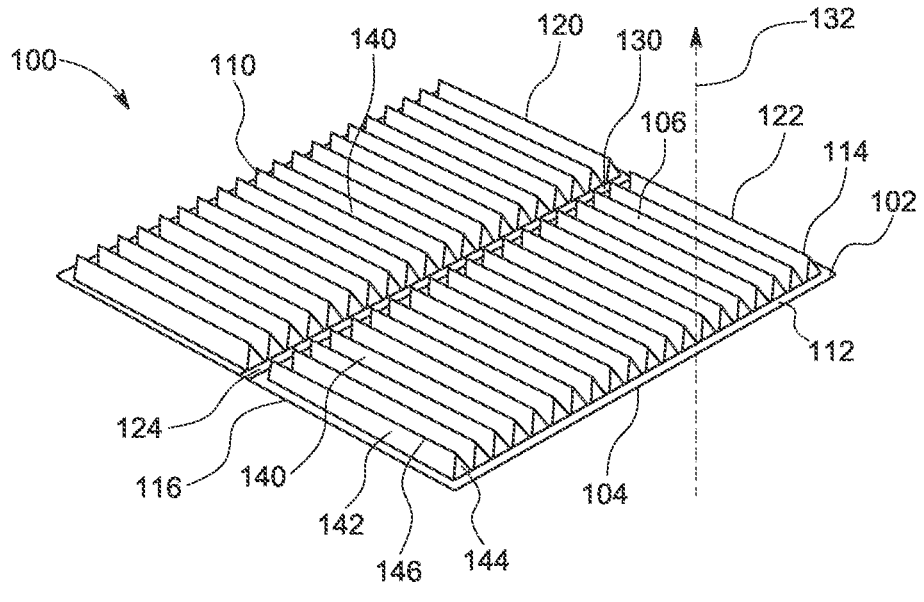
FIG. 1A is a perspective view of an example air filter media for use with the example filter frame, in accordance with an embodiment.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1A is a perspective isometric view of an example typical replacement filter media 100. The filter media 100 includes a generally rectangular shaped filter layer 102 defining a bottom side 104 and a top side 106. The principles herein apply for filters that are square in shape with equal length sides. The filter includes a lengthwise outer edge 110 and an opposite lengthwise outer edge 112. Two opposite widthwise outer edges 114 and 116 are perpendicular to the outer edges 110 and 112. Thus, the outer edges 110, 112, 114, and 116 define the area of the filter layer 102. A series of pleated filter strips 120 and 122 form the filter layer 102. The joined filter strips 120 and 122 define the outer edges 110 and 112 and the outer edges 114 and 116. In this example, a seam 130 is formed between the pleated filter strips 120 and 122.

Based on the position of the air filter 100 within an air flow system, the air flow (represented by an arrow 132 in FIG. 1A) from the air flow system enters from the bottom side 104 of the filter 100, and exits from the top side 106 of the filter 100. The air flow directed through the filter 100 is sourced from natural outside air and is then forced through the filter 100 to facilitate the filtering or cleaning of the air before entering the inward dwelling of a residential or commercial structure. Additionally, in some embodiments, the air source can also be recirculated air from within the residential or commercial structure. Accordingly, the filtered air exits through the top side 106 of the filter 100.

As shown, the filter 100 includes the opposite lengthwise outer edges 110 and 112. Each of the outer edges 110 and 112 are configured to maintain a tight seal of the one or more pleats of a pleat strip such as the pleat filter strips 120 and 122 that form the outer edges 110 and 112. In this example, the outer edges 110 and 112 are structured to be a maximum of 1.2 millimeter (mm) thick, in order to create a sealed foundational base for each of the pleats in a pleat strip such as the pleat filter strip 120. In this example, the pleat filter strips 120 and 122 are interconnected using a tape attachment 124 that facilitates folding of the filter media 100 for shipment and disposal.

Each of the pleated filter strips such as the pleated filter strip 120 has a series of pleats 140. Each of the pleats 140 have rectangular shaped opposite sides 142 and 144 that are joined at a common joint 146. Thus, the side portion of each of the pleats 140, is shaped in a triangular shape with the opposite sides 142 and 144. In this example, the pleats 140 are fabricated of synthetic filter media with a top filtration layer and a back supporting layer.

Figure 1B:
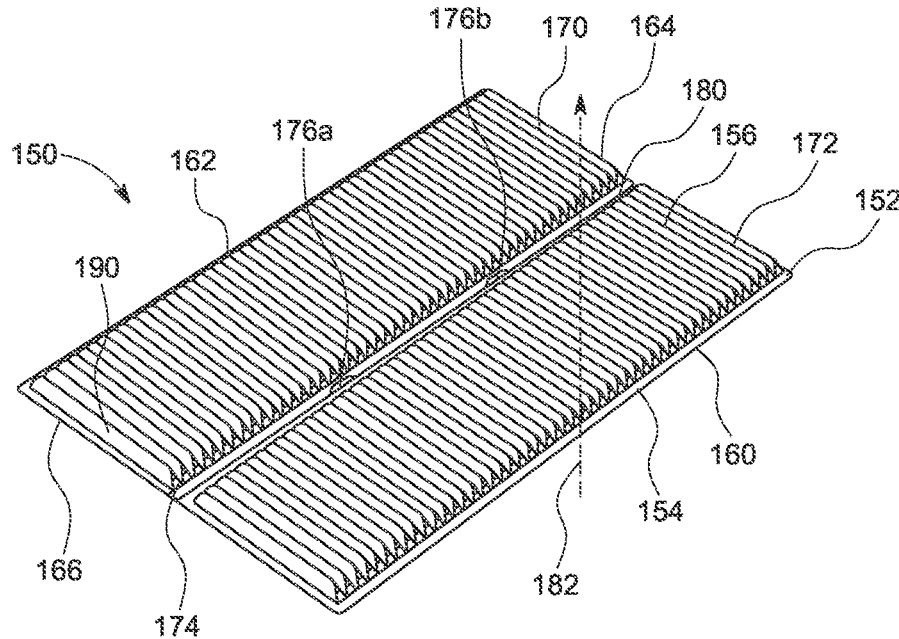
FIG. 1B shows another example of an example filter media that may include cuts-out on an interconnecting tape for use with the example filter frame, in accordance with an embodiment.

FIG. 1B is a perspective isometric view of another example of another filter media 150. The filter 150 includes a generally rectangular filter media 152 defining a bottom side 154 and a top side 156. The filter media includes a lengthwise outer edge 160 and an opposite lengthwise outer edge 162. Two opposite widthwise outer edges 164 and 166 are perpendicular to the outer edges 160 and 162. Thus, the outer edges 160, 162, 164, and 166 define the area of the filter media 152. A series of pleated filter strips 170 and 172 form the outer edges 160 and 162 and the outer edges 164 and 166. In this example, a seam 180 is formed between the pleated filter strips 170 and 172.

Similar to the air filter 100 in FIG. 1A, the air flow (represented by an arrow 182 in FIG. 1B) from the air flow system enters from the bottom side 154 of the filter 150, and exits from the top side 156. Each of the outer edges 160 and 162 are configured to maintain a tight seal of the one or more pleats of a pleat strip such as the pleat strips 170 and 172 within the outer edges 160 and 162. The pleat filter strips 170 and 172 are interconnected using a tape attachment 174 that facilitates folding of the filter media 100 for shipment and disposal.

The filter media formed by the overlapping and attached edges of the filter strips 170 and 172 has multiple cut-outs 176a and 176b. A will be explained the cut-outs 176a and 176b allow or frame components and sections of components attached to the frame to pass through the filter media. The cut-outs 176a and 176b are formed through the interconnecting attachment tape 174 that connects the filter pleat strips 170 and 172.

Each of the pleated filter strips such as the pleated filter strip 170 has a series of pleats 190. Each of the pleats 190 have trapezoid shaped opposite sides that are joined at a common joint. Thus, the side portion of each of the pleats 190 has a triangular shape with the opposite sides. In this example, the pleats 190 are fabricated of synthetic filter media with a top filtration layer and a back supporting layer.

The tapering of the pleats 190 also works in conjunction with a tapered cross member on the air filter frame that may be inserted in an air flow system. Using a tapered cross member with the tapering of the pleats 190 results in a higher tolerance air flow system design. Matching the tapered sides of the pleats 190 with the tapered cross member makes it easier to position the filter 100 into position, while also ensuring that the filter 100 stays into place with gravitational force. Similarly, the sides of the triangular pleat 190, provides for a planar face of the filter pleat 190. Most of the air flow forced through the filter 100 via an associated air flow system will be received and filtered through the planar sides of the pleats 190. The planar face of the sides of the filter pleats 190 increases the surface area of the pleats 190, and the corresponding filter, in order to minimize the air pressure drop across the entire filter 100.

The details of the foldable shippable and disposable filter media such as the filters 100 and 150 are detailed and claimed in a co-pending provisional application Ser. No. 63/244,052 filed Sep. 14, 2021, and titled "Collapsible and Foldable Pleated Disposable Air Filter." The contents of that application are hereby incorporated by reference. As explained in that application, exemplary foldable filters may have more than the two pleated filter strips in the examples herein. Thus, the principles disclosed herein may be incorporated by a filter having three, four or more filter strips, depending on the desired dimensions of the filter.

Figure 2:
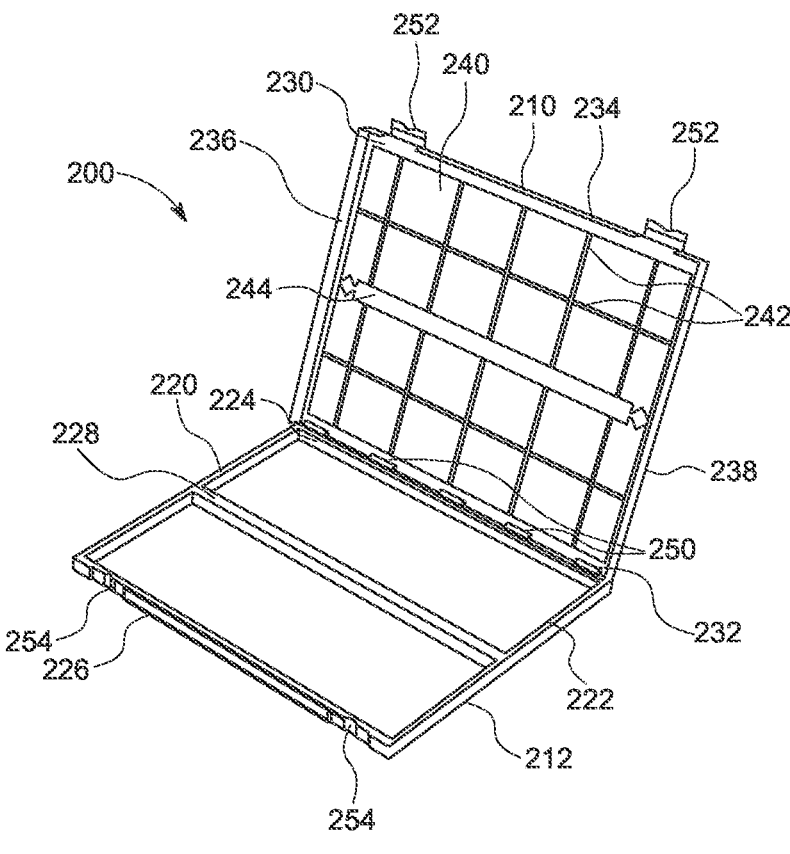
FIG. 2 is a perspective view of an example air filter frame, in accordance with an embodiment of the invention.

FIG. 2 shows an exemplary filter frame 200 for holding disposable and foldable filter media such as the filter 100 in FIG. 1A or the filter 150 in FIG. 1B. A foldable air filter can be placed within the filter frame assembly 200 in order to maintain the shape and integrity of the air filter itself during operation of the filter in an air flow system such as an HVAC system. The filter frame 200 therefore may be inserted in conventional filter slots in an air flow system. When the filter media becomes dirty from use, the frame 200 may be pulled out of the slot, and the existing filter media may be replaced by a clean filter media.

The example filter frame 200 is constructed from two injection molded parts, a frame cover 210, and a frame base 212. The frame base 212 includes a pair of frame supports 220 and 222. Another pair of frame supports 224 and 226 are attached between the ends of the frame supports 220 and 222. The frame supports 220 and 222 is configured to be positioned widthwise of the frame base 212 of the frame 200. This frame supports 220 and 222 provide a flat surface that a filter such as the filter 100 in FIG. 1A or the filter 150 in FIG. 1B will rest on, in order to create a seal with the frame 200 and one side of the filter. The frame supports 224 and 226 are positioned to define the length of the frame base 212 of the frame 200. The frame supports 224 and 226 also have a flat surface for the filter to create a seal against on one of the sides of the filter.

The frame base 212 also includes a cross member frame support 228 that is attached between the frame supports 220 and 222. The cross member 228 may have a triangular or trapezoid cross section in order to help guide a user when replacing a filter such as the filter 100 in FIG. 1A into the frame 200, thereby improving the tolerance for user accuracy during replacement. In this example, the seams 130 and 180 in the respective filters 100 and 150 fit in the cross member 228 when the filter is inserted in the frame 200. The frame support 228 provides a flat surface that the filter will rest on, and may create a seal along an interconnection tape such as the attachment tape 124 of the filter 100 with the frame 200. In other larger filter frame incorporating the principles herein, such frame may include multiple frame-supports positioned along the length of the frame base 212 of the frame 200. When there are multiple frame supports in a frame, the supports can be placed sufficiently close to provide adequate support for the filter against the air flow direction. The closeness of the cross members allows the filter to resist flattening, and deformation caused by the air flow.

The frame cover 210 has an outside rectangular frame 230 that includes a lengthwise support member 232 that is joined to the frame base 212. An opposite edge 234 extends from the unattached side of the frame 230. The cover 210 includes parallel widthwise edges 236 and 338. The dimensions of the outside rectangular frame 230 match the shape of the frame base 212. A top layer 240 is supported by the borders of the outside rectangular frame 230. The top layer 240 includes a series of cross latched linked wires 242 in a grid pattern. The cross latched wires 242 are configured to retain the air filter when the frame 200 is in an upside-down position. This is most common when the filter and frame 200 are being installed within a residential or commercial ceiling. A cross member 244 extends between the edges 236 and

238 to assist in retaining the filter in position when the cover 210 is closed over the frame base 212.

The frame cover 210 and the frame base 212 can be ultrasonically welded together. The frame cover 210 is made from a flexible plastic in order to support five hinges 250 connecting the support member 232 of the frame cover 210 to the support 224 of the frame base 212. The hinge mechanisms 250 allow the cover 210 to be opened 180 degrees, and up to 270 degrees relative to the frame base 212 to allow a user to easily remove and replace a filter.

The frame cover 210 is lowered over the frame base 212 in order to securely enclose the filter within the frame 200. The filter is then secured within the filter frame 200 along all four sides of the filter by the edges 234, 236, and 238 overlapping the frame base 212. On the remaining side of the frame cover 210, the hinges 250 join the top of the frame base 212 with the frame cover 210 to secure that side. 210 may further include one or more retaining clips when needed to stabilize the filter on the lengthwise edges 232 and 234 of the frame cover 210. The retaining clips may be positioned along the length edge of the filter when the frame cover 210 contacts the filter.

In one embodiment, the frame 200 can include a latching mechanism on the frame cover 210 and the frame base 212. The latching mechanism includes two latching devices 252 on the edge 234 of cover 210 and corresponding latching sockets 254 on the support 226 of the frame base 212. The corresponding latching devices 252 and sockets 254 allow for the cover 210 to be secured to the frame base 212. In some instances, this can be a key and latch system, or a magnetized lock, or another similar latching device.

Figure 3:
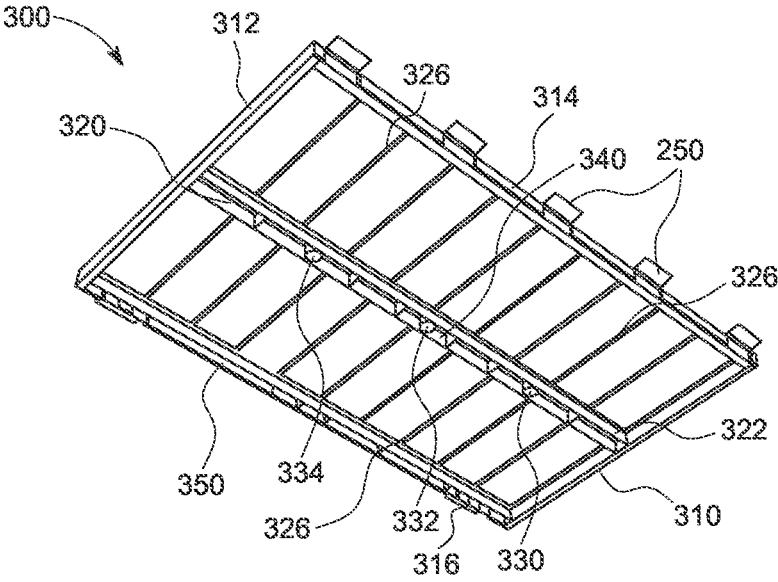
FIG. 3 is a perspective view of another example frame base with a sensor system of a frame structure that may be mated with a frame cover for holding the example air filters in FIGS. 1A-1B.

FIG. 3 is a bottom perspective view of another example frame base 300 that may be used instead of the frame base 212 in FIG. 2. Thus, the frame base 300 may be attached to the cover 210 in FIG. 2 via the hinges 250 to form a different type of filter frame. The frame base 300 includes a pair of frame supports 310 and 312. Another pair of frame supports 314 and 316 are attached between the ends of the frame supports 310 and 312. The frame supports 310 and 312 is configured to be positioned widthwise of the frame base 300. The top surfaces of the frame supports 310 and 312 provide a flat surface that the edges of a filter such as the filter 100 in FIG. 1A or the filter 150 in FIG. 1B will rest on, in order to create a seal with the frame and one side of the filter. The frame supports 314 and 316 are positioned to define the length of the frame base 300. The frame supports 314 and 316 also have a flat surface for the width wise edges of the filter to create a seal against on one of the sides of the filter. The near frame support 314 includes the hinges 250 that may be attached to the cover 210 in FIG. 2. The frame 300 can further include permanent magnets integrated into the underside of the supports 310, 312, 314, and 316 to aid in ceiling installations where the air filter mounting box is made of a ferromagnetic material. Magnets with sufficient strength will allow the filter assembly of the frame 300 and the frame cover 210 to remain in place after being installed eliminating the need for the user to hold the filter while trying to close the filter frame cover.

The frame base 300 also includes a cross member frame support 320 that is attached between the frame supports 310 and 312. The cross member 320 has a trapezoid cross section in order to help guide a user when replacing a filter such as the filter 100 in FIG. 1A into the frame base 300, thereby improving the tolerance for user accuracy during replacement. The frame support 320 includes a wider bottom surface 322 and an opposite narrower top surface 324. The top surface 324 provides a flat surface that the filter will rest on, to create a seal along an interconnection tape such as the attachment tape 124 of the filter 100. Depending on the size of the frame the frame support 320 may be stabilized by supports 326 provided perpendicular to the frame support 320.

The filter media 100 in FIG. 1A and 150 in FIG. 1B also have specifically formed edges along the respective filter layer 102 and 152 and a center tape attachment 124 or 174 that mesh with the interior edge ridges of the supports 310, 312, 314, and 316 as well as the surface 324 of the center support 320 on the frame base 300 to be held firmly in place by the edges 234, 236, and 238 and the center member 244 on the frame cover 210. The meshing and compression of the edges enable the closed frame to hold the disposable filter media 100 or 150 firmly with no air flow or air leakage around the filter media once the filter media 100 or 150 is inserted within the frame once the frame base 300 and the cover 210 is securely closed and latched either using latches 252 in FIG. 2 or the magnetic attachment mechanisms 330, 332, and 334 in FIG. 3. It should be understood that, other filter frame structures exist than that shown in FIG. 2 and preferred latching mechanisms other than the mechanical one shown in FIG. 2 or the magnetic mechanism in FIG. 3 may be used.

The frame base 300 includes a magnetic closure mechanism that includes mechanisms 330, 332, and 334 on the frame support 320 of the frame base 300. The closure mechanism includes metallic discs that may be installed on the cross member 244 of the top cover 210 that are magnetically attached to the mechanisms 330, 332, and 334 when the top cover 210 is closed on the frame base 300. As will be explained, the frame support 320 also includes an air pressure sensor 340. The air pressure sensor 340 is coupled to a filter monitoring system 350 that is attached to the frame support 316.

Figure 4A:
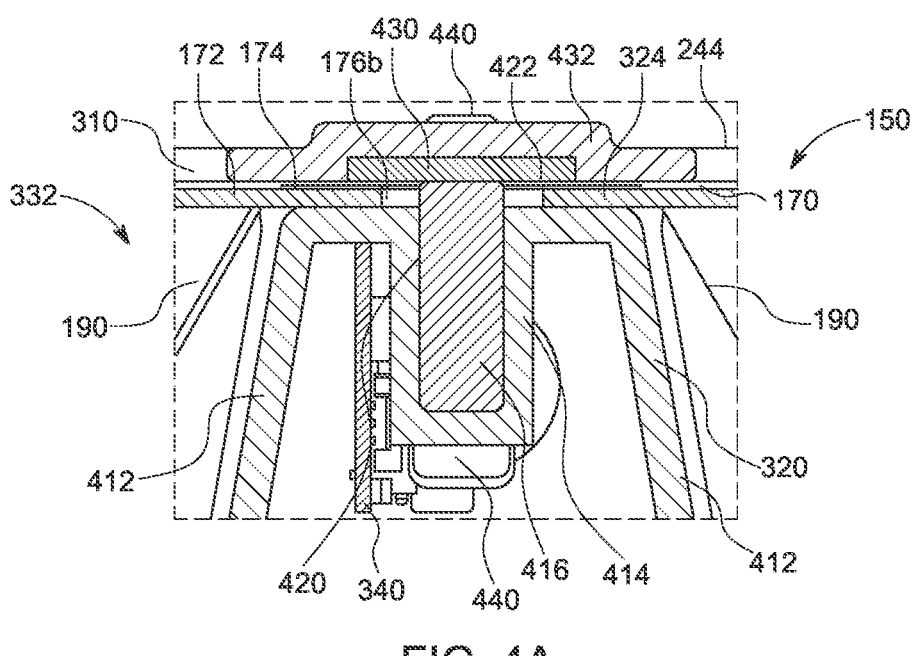
FIG. 4A is a cross section through a magnetic closure mechanism for the air filter base frame in FIG. 3 to hold the frame closed according to one embodiment.
Figure 4B:
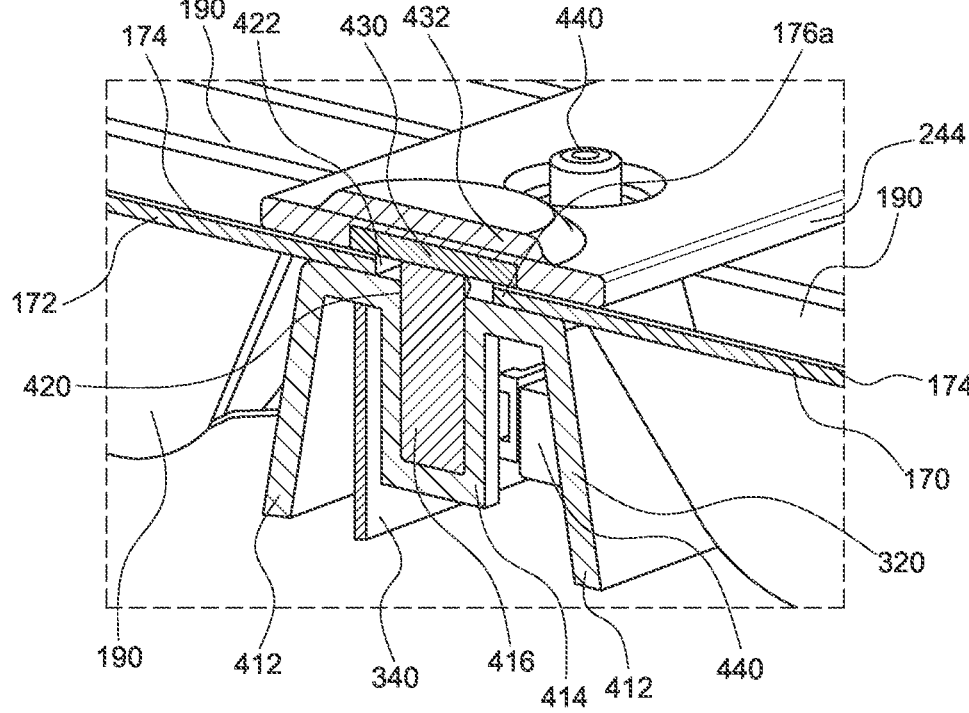
FIG. 4B is a cross-section view of the magnetic closure mechanism in FIG. 4A.

FIG. 4A is a cross section view and FIG. 4B is a perspective view of the alternative magnetic attachment mechanism 332 and the air pressure sensor 340 in FIG. 3 when a filter such as the filter 150 is inserted in the frame base 300 in FIG. 3 and attached to the top cover 210 in FIG. 2. Like elements from FIGS. 2 and 3 are labeled with identical reference numerals in FIGS. 4A-4B.

The latching scheme of a filter frame that includes the frame base 300 in FIG. 3 and the top cover 210 in FIG. 2 uses magnetic closure. The frame support 320 includes sloped sides 412 that are in general contact with the sides of the pleats 190 of the filter strips 170 and 172. The edges of the filter strips 170 and 172 are supported by the surface 324 of the frame support 320. A cylindrical holding structure 414 is formed on the surface 324 of the frame support 320. A permanent magnet 416 is inserted in the holding structure 414 so the top of the magnet 416 is flush with the flat top surface 324 of the frame support 320. A cut-out 420 is provided on the top surface 324 of the central frame support 320 to allow the magnet 416 to extend through. The cut-out 420 is approximately the same size as the cut-out 176*b* in the filter 100 and a cut-out 422 in the interconnecting attachment tape 174 interconnecting the filter strips 170 and 172 in FIG. 1B. The cut-outs 420, 422 and 176*b* allow the magnet 416 to extend out of the frame base 212.

At a location corresponding to each magnet such as the magnet 416 on the frame support 320, a steel disk 430 is attached within an embossed structural protrusion 432 formed in the cross member 244. This positional alignment allows the steel disk 430 to engage with the magnet 416 and hold the frame assembly closed after the filter media 150 is inserted between the frame base 300 and the frame cover 210. By using strong magnets and having a multiple magnetic closure systems distributed as shown in FIG. 3 on the frame base 300, a very secure and effective closure can be ensured for the filter frame assembly without having failure prone mechanical components.

The filter frame assembly that incorporates the frame base 300 in FIG. 3 has a more complex design than the frame base 212. Such a design includes magnetic latching and instantiation of differential pressure and other sensors with a communication capability for communicating the sensed data to the user. The frame base 300 also may include a device to actively energize the sensors and associated electronics circuits only when there is air flow through the air filter.

The preferred frame base 300 may include differential pressure sensors and other useable sensors. These other sensors comprise any of temperature, humidity, oxygen content, CO2 concentration sensors, etc. The frame base 300 preferably has a communication module that is able to wirelessly communicate with a user regarding replacement of filter media such as the filter 100 and 150 when the differential pressure on the top and bottom of the frame indicates a need for filter replacement. The communication module is also enabled to provide information on other sensed parameters to the user. The communication module also reduces power dissipation and improves the life of the components by enabling the sensors to be powered on only when the ventilation system incorporating the filter is operational with air flow through the filter.

The preferred filter frame design incorporating the frame base 300 includes the air pressure sensor attached to an air pressure sensing port 340 that is integrated into the frame support 320. The air pressure sensing port 340 is positioned near air flow entering and exiting the air filter 150. In this example, the air filter pressure sensor includes a differential air pressure sensor that is configured to measure the static air pressure before air flow enters the air filter 150 and after the air flow exits the air filter 150 through an air flow conduit structure 440. The sensed differential pressure reading is used to provide feedback to the user on when the filter should be replaced.

Figure 5:
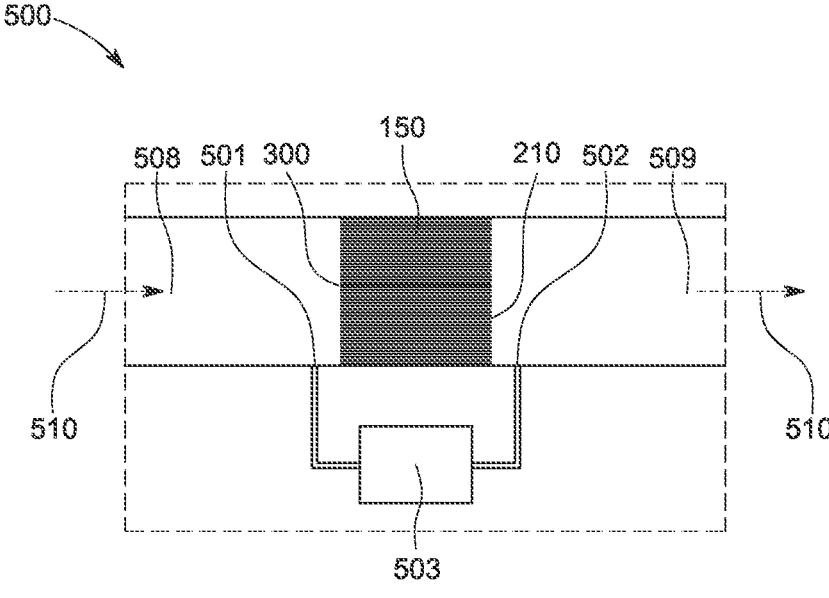
FIG. 5 is a schematic diagram indicative of the operation of an example differential pressure monitor in the sensor system in FIG. 3.

FIG. 5 shows an example differential air pressure monitoring system 500 that is incorporated in the frame assembly of the cover 210 and the frame base 300. Pressure ports 501 and 502 are established on an inlet side of the frame base 300 and an outlet side 502 of the frame cover 210 to monitor the inlet air pressure and the outlet air pressure in an air channel 510 when the system is operating with air flowing through an air filter such as the air filter 150 inside from an inlet 508 to an outlet 509. A differential pressure air pressure monitoring system with a differential air pressure sensor 503 checks and reads the differential pressure between the two sides of the air filter 150. An increase in differential pressure indicates degradation of the air filter media due to the pores in the pleats that allow air flow being clogged. This change from an initial baseline value is used to determine when the filter media should be changed.

When a new replacement air filter media 100 or 150 is installed in the frame assembly, the air filter monitor can be triggered to take the initial baseline differential air pressure measurement while air is flowing through the filter. This initial differential air pressure measurement is stored and serves as a baseline that can later be compared against to determine when the air filter should be replaced. Over time the air filter will collect particulate matter leading to a reduction in air flow through the air filter and a decrease in static air pressure after the filter. The differential static air pressure before and after the filter will typically be between 0.03 to 1 inch water column. In this example, the air filter 100 or 150 typically needs to be replaced when the differential air pressure is twice that of the measured baseline pressure.

Some air flow systems that use the filter media 100 or 150 have variable fan speeds and will require the system to automatically adjust the baseline to reflect the usage at various air flow rates. When a new air filter media 100 or 150 is installed, a new baseline may thus be established by triggering an initial measurement of the differential pressure. This may be done electronically by a user pressing a button on the frame signaling to a differential air pressure sensor controller that the air filter media is new. The initial measured value may be stored as the new baseline value for comparison to subsequent differential pressure measurements and for deciding a filter media replacement need.

Figure 6:
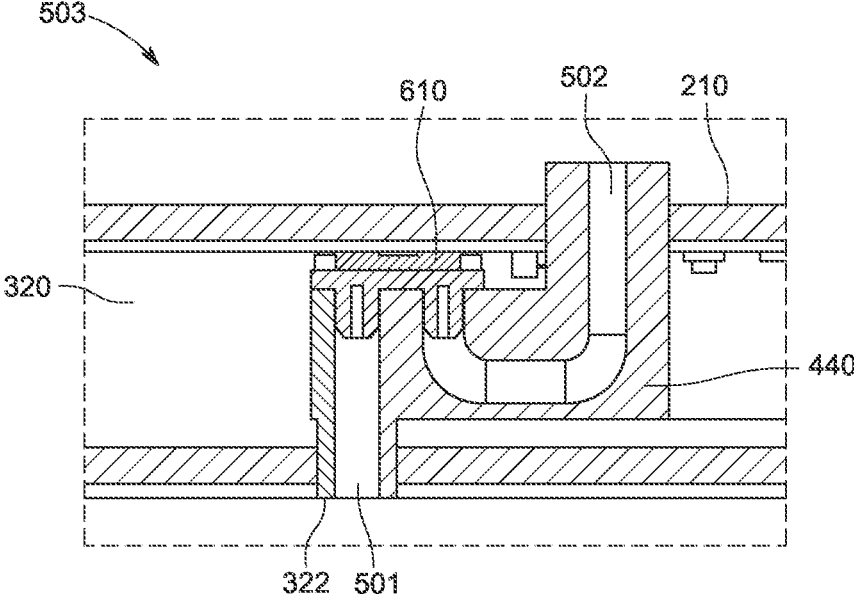
FIG. 6 shows an example of the structure of the differential pressure monitor in FIG. 5.

FIG. 6 shows the structure of the differential pressure sensor circuit 503 in FIG. 5. The sensor circuit 503 includes the air differential conduit structure 440 that is inserted in the frame support 320. The conduit structure 440 includes the inlet port 501 that is in fluid communication with the bottom surface 322 of the frame support 320. The inlet port 501 thus allows sensing the pressure at the air inlet before air flows through the air filter 150. The conduit structure 440 includes the second port 502 at the air outlet after the air flow exits the filter 150. The second port 502 is located at the cover 210 to sense air exiting the filter. A differential air pressure sensor 610 senses the differential pressure between the port 501 at the air inlet and the port 502 at the air outlet. Thus the sensor circuit 503 determines the differential pressure across the air filter 150 based on the outputs of the differential air pressure sensor 610. The change/increase in the differential pressure sensed across the filter media such as the filter 150 over time as the filter is in operation is used to determine the need to replace the filter media.

Figure 7:
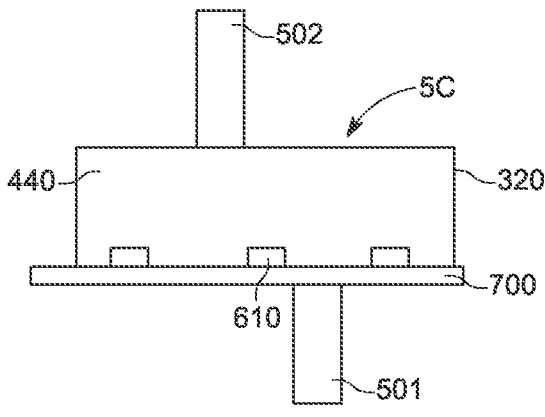
FIG. 7 shows an example of the differential pressure monitor fixed to a printed circuit board for communication to the control system.

FIG. 7 shows a cross section view of the air differential conduit structure 440 in relation to a printed circuit board 700 that may be attached to the interior of the frame support 320. The printed circuit board 700 includes components for electrical connection to the differential air pressure sensor 610 and signal processing components for processing sensed data from the differential air pressure sensor 610 to the control system.

For the various operations of the air pressure sensor 340 including configuration control there is a need for a control system to handle the operations efficiently. This includes the tracking of the differential pressure across the filter in the frame assembly and making decisions on when a filter change is needed, etc. It is also important to determine the rate at which the filter media deteriorates in specific applications for improving product functionality.

The control system typically includes at least a controller or processor, a memory coupled to the controller, the differential air pressure sensor 610 also coupled and controllable by the controller, other optional sensors such as sensors for temperature, humidity, oxygen saturation, CO2 content etc., various light emitted diodes, and a sound emitting device for notifying status of the air. The controller reads a differential pressure measurement across the air flow and compare the measured value with a baseline value determined when the filter is initially installed. Based on the comparison, the controller may determine operational and maintenance status of the filter. The control system may also include a push button for user input for establishing the baseline pressure, a battery power source, and a communication module that is typically a 2-way radio transceiver with an antenna used to transmit sensor readings to a local network or the internet for processing and, if needed, storing data for later analysis.

Figure 8A:
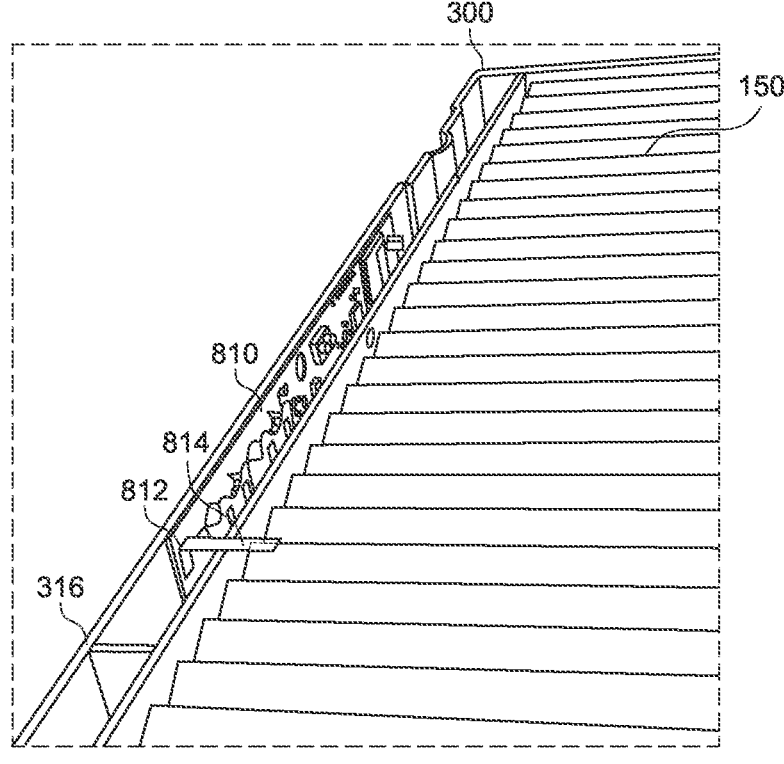
FIG. 8A is a perspective view of the example frame base in FIG. 3 with a printed circuit board that includes electronics components for collecting and analyzing air pressure data from the example filter frame base.

FIG. 8A is a perspective view of the support 316 that holds the filter monitoring control system 350 of the frame base 300 in FIG. 3. The frame base 300 holds an air filter such as the air filter 150 in FIG. 1B. The filter monitoring control system 350 includes a printed circuit board 810 that is attached to the interior side of the support 316. In this example, the printed circuit board 810 may include a controller, other sensors, the communication module, and flow sensor. The printed circuit board 810 may also include memory devices for data storage and a power source such as a battery. User controls such as buttons and displays such as LEDs may be mounted on one side of the printed circuit board for access by a user from the exterior of the support 316.

The printed circuit board 810 includes an air flow sensor switch 812 with an extension paddle 814 into the air stream flowing through filter 100. The paddle 814 is moved by air flow and activates the sensor switch 812 to enable power to the components of the printed circuit board 810. The extension sensor switch 812 provides the capability to power on or off the filter sensor system which enables the system to be powered only when air flow is forced through the air filter by the air flow system. This reduces the power dissipation of the components of the printed circuit board, and extends the life of the power source which typically consist of one or more batteries.

Figures 8B, 9:
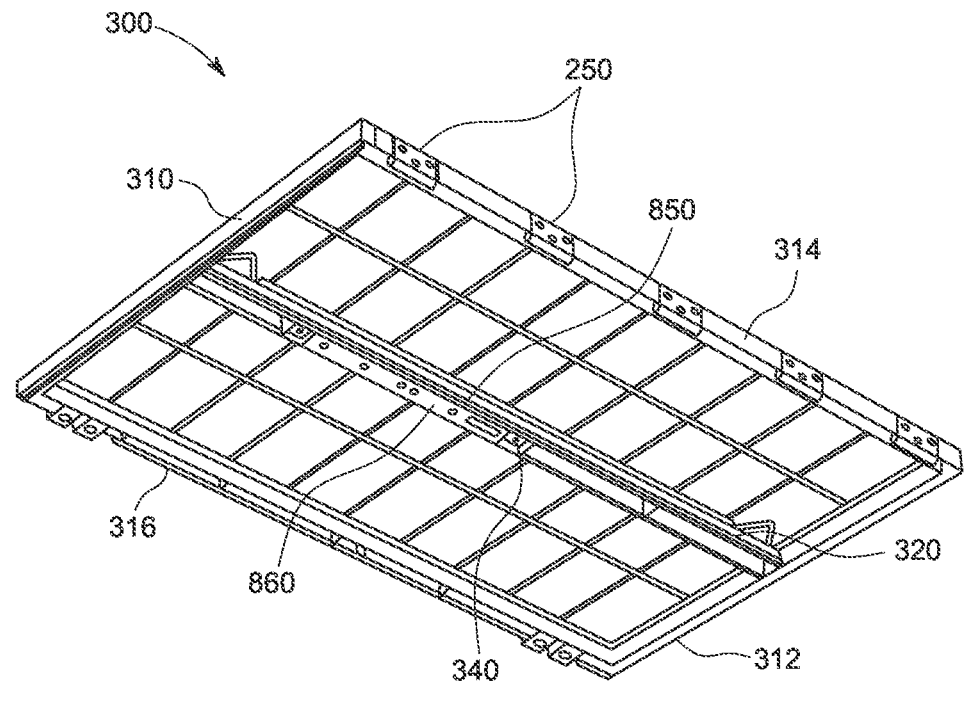
FIG. 8B shows another example of a frame base with a control printed circuit board in an alternate location.
FIG. 9 is a block schematic of a typical control and communication board used with the filter system.

FIG. 8B shows another example mounting of a filter monitoring system such as the filter monitoring system 350 within a base frame. In this example, a frame 850 holds a printed circuit board 860 with the same functionality as the circuit board 810. The frame 850 is shaped to be attached to the interior of the central support 320 of the frame base 300. The printed circuit board 860 may be attached in proximity to the air pressure differential sensor 610. In this example, the separate air flow sensing unit with the switch and paddle referenced in FIG. 8A are not used for powering the system. A reading from the differential air pressure sensor 610 coupled to the air pressure sensing port 340 is used to turn on the electronics on the printed circuit board 860 during filter operation. When air flow ceases, the electronics are turned off to save power.

It should be understood that, the controller, when operational, is able to communicate with the user and provide information on the need for air filter media replacement as well as battery replacement as already described.

The collection and storage of sensed data from the various sensors during the operation of the air filtration system enable the optimization of the HVAC system operation including choice of the optimal filter media and its replacement schedule.

FIG. 9 shows a block diagram 900 of a typical filter monitoring and communication system as implemented with the capabilities described above. The filter monitoring and communication system includes a processor 910, a memory 912, a series of sensors 914a to 914b, a baseline set switch 916, and a wireless communication module 918. The processor 910, memory 912, sensors 914a-914n, baseline set switch 916, and wireless communication module 918 are all interlinked by a bus 920. In this example, the processor 910 is a low energy is a low energy processor, although any processor, controller, microcontroller, or other programmable device may be used. The memory 912 includes a flash memory for storage of programs for the processor 910. The flash memory may also include storage for collected historic data of filter media use and system maintenance information. The memory may also include system random access memory (RAM) for storing configuration details of the system.

The disclosure also relates to communicating the operational and maintenance status of the air filter determined by the controller to a user. The processor 910 may control an optional visual output device 922 that may be programmed as a visual indicator to indicate when a filter needs replacement. For example, the output device 922 may be a system of colored LEDs where a green LED indicates normal operation, a yellow LED indicates a warning that the filter is nearing end of use, and a red LED indicates the filter needs replacement. As explained above, different thresholds of percentages of the baseline differential pressure measurements may be used by the controller to activate the different LEDs. Other indicators may indicate the status of the battery in the system 900 or the connectivity status of the system to the user devices. Alternatively, the output device 922 may be a display such as an LCD display that outputs filter operational status and other data from the available sensors attached to the frame and the air flow system, such as humidity or temperature readings. Alternatively, the output device 922 may be an audible indicator such as a beeper or a buzzer may be triggered by the output signal to indicate the operational of maintenance status. In this example, the wireless communication module 918 may include one or more of a low power WiFi module, a Bluetooth connection module or a cellular connection module.

As explained above, the processor 910 takes periodic readings from the air pressure differential sensor 610 to determine the effectiveness of the filter. For example, the readings may be taken and stored every day once or even each time the air flow is initiated. This data is stored as historic data in the memory. A power source 930 that is typically a battery provides power to the various subsystems of the control system through the air flow sensing switch 812 to provide power during operation of the filter system. As explained above, the power source 930 may be activated to provide power for the electronic components that control the air filtration when air flow is sensed by the air flow sensing switch. The power source 930 may be disconnected from the filtration sensors when no air flow is sensed. The design of the controller will define which sub systems remain powered up and operational when no air flow is sensed. The baseline set switch 916 may be coupled to external buttons for a user to activate the baseline determination from the air pressure differential sensor 610 once a new filter is installed in the frame assembly.

Having the memory 912 with the processor 910 enables collection and storage of operational data on the performance of the filter during operation of an air flow system such as an HVAC system. The collection of such data can lead to analytical insights to improve the performance of the filter. This data can also provide insight into the health and performance of the HVAC system.

The sensors 914a-914n may include absolute air pressure sensors, temperature sensors, humidity sensors, volatile organic compound sensors and air quality sensors. As will be understandable to the practitioners of the art, collected data on the seasonal variations of temperature, humidity, pollutants and outside air quality can be used effectively to create operational patterns for an HVAC system that optimizes its operation and effectiveness. For example, during winter months the sensed temperature and humidity can be correlated to the use of heating power and how the heating of the air and humidity control can optimized in the setting by the user to have the most comfortable home or office conditions. Similarly, during the spring, pollutants and pollen may demand faster air exchange and the filter life will be lowered. This factor can be built into the filter ordering schedule to help the user be ready for filter replacement when it is indicated.

The communication module 918 allows the processor 910 to provide information on the performance of the system to an external device accessible to a user. For example, a mobile device or hand-held device such as a smart phone may receive the data collected by the processor 910. Alternatively, a server such as a cloud server used to monitor and operate the air flow system may receive the collected data and send corresponding alerts and analysis data to the external device accessible to the user. The communication module 918 allows the communication of the differential pressure values to a backend processor on an external device such as the mobile device or a cloud server. The backend processor evaluates the data and indicate filter change requirements, namely operational and maintenance status to users typically through a communication to a mobile application on a smart phone associated with the user, by push notification or email to the user, or other physical means, such as signal lights or sounds from an audible indicator in the filter system itself indicating the need for filter media change.

Analysis of the data may be performed by either the processor 910 or an external device with the backend processor from a communication from the system 900. The data analysis may be used for different purposes such as determining need to change the air filter media based on the differential pressure readings and the need to replace the battery power source for efficient working of the air monitoring system. The data analysis may be communicated to a controller for the air flow system to assist in diagnostics relating to the operation of the air flow system.

Figure 10:
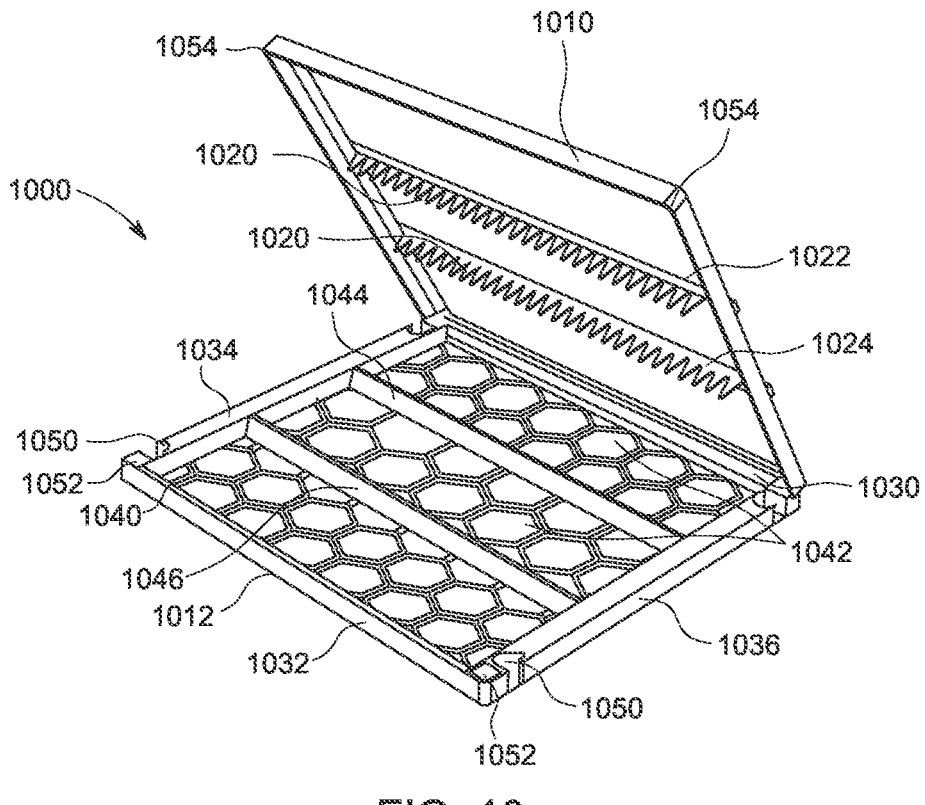
FIG. 10 is a perspective view of another example air filter frame for holding a foldable air filter.

FIG. 10 is an alternative embodiment of a filter frame 1000 that may hold a filter such as the filter 100 in FIG. 1. The alternative embodiment filter frame 1000 shown in FIG. 10 is configured to operate in a similar fashion to the above discussion of the preferred filter assembly. The frame 1000 includes a hinged top cover 1010 attached to a frame base 1012. In this example, the top cover 1010 includes one or more pleat shaped fingers 120 that extend from lateral cross members 1022 and 1024. The pleat shaped fingers 1020 are configured to integrate with the frame cover 1010 in order to shape the pleats of an air filter such as the air filter 100 in FIG. 1A or the air filter 150 in FIG. 1B is held within the frame 1000. The shaping of the pleats of the filter by the pleat shaped fingers 1020 is important to prevent flattening or misalignment that is caused by the folding and fitting of the filter into an envelope that may be delivered to the operator of the air flow system.

The example frame base 1012 includes lengthwise support members 1030 and 1032 that are joined to widthwise support members 1034 and 1036. The frame base 1012 includes a frame bottom support 1040 that includes wires 1042 suspended by the supports 1030, 1032, 1034, and 1036 forming the frame base 1012. The wires 1042 in this example form a hexagonal pattern, but other patterns such as a grid may be used. Additional cross members 1044 and 1046 are extended between the support members 1034 and 1036 that are parallel to the support members 1030 and 1032. The frame bottom support 1040 is configured to support the bottom of a filter in the case where the filter is damaged or subject to extreme air flow from the air flow source. This is also advantageous where the filter gets dislodged, as the wires 1042 of the bottom support 1040 causes the filter to retain its shape within the frame 1000. The frame bottom support 1040 also prevents the air filter from getting sucked into a furnace, preventing an unwanted fire. In some embodiments, the wire pattern 1042 of the frame bottom support 1040 can also be configured to receive add-ons like activated carbon inserts or scent inserts to be securely placed in the air filter.

The frame 1000 can further include two finger grasps 1050 formed on the open ends of the supports 1034 and 836. The finger grasps 1050 can be constructed to be similar to finger grips, in order to help a user to firmly grasp the filter frame 1000. The finger grasps 1050 enable a user to open a tightly closed frame easily by providing a capability to grasp the frame cover 11010 to open it easily. The finger grasps 1050 can be positioned lengthwise and widthwise of the frame 1000 in order to make it easier for a user to grab the filter frame 100 during installation and removal of the filter media.

The frame 1000 can further include a magnetic latching system. The latching system includes magnetic discs 1052 that are attached to the open ends of the supports 1034 and 1036. Magnetic discs 1054 are attached to corresponding corners on the top cover 1010. The discs 1054 may be magnetized steel, corresponding to similar steel magnetic discs 1052 of an opposite polarity on the frame base 1012. The magnetic latching system is configured to secure the frame cover 1010 to the frame base 1012 when the cover 1010 is rotated to join the frame base 1012. Upon the steel discs 1052 and 1054 contacting each other, the top cover 1010 is magnetically secured and latched to the frame base 1012. The filter is thus secured between the top cover 1010 and the frame base 1012.

The frame 1000 can further include permanent magnets integrated into the underside of the supports 1030, 1032, 1034, and 1036 to aid in ceiling installations where the air filter mounting box is made of a ferromagnetic material. Magnets with sufficient strength will allow the filter assembly of the frame 1000 and the filter to remain in place after being installed eliminating the need for the user to hold the filter while trying to close the frame cover.

The following disclosed embodiments provide advantages over currently available solutions.

The disposable foldable filter media 100 and 150 provides lower shipping costs of the foldable disposable filter media described in the co-pending provisional application No. 63/244,052 titled: Collapsible and Foldable Pleated Disposable Air Filter of Winston Mok filed on Sep. 14, 2021. Currently available solutions are not capable of fitting within a standard large envelope size, thus incurring additional shipping costs for the consumer. The foldable filter media 100 and 150 also decrease waste as only the filter media is to be disposed, which takes up less space than the support frame material that need to be disposed with the media in other existing filters. The ability to be folded also allows encapsulating trapped particulate matter and avoids release of harmful toxins, bacteria, dust, and contaminants trapped in the filter material into the air during disposal. The use of the filter media 100 and 150 in conjunction with the filter frame 200 or 300 results in cost reduction by eliminating the cost of the support frame disposed with the media of existing filters.

The disclosed frame provides a fixed firm support for foldable filter media such as the filters 100 and 150 that eliminates issues of sagging of such filters. The disclosed frame prevents air flow around the filter media by providing a close-fitting construction of the filter edge and the frame edge that prevents air leakage along the edge of the filter media. The disclosed frame is designed to open and close and firmly hold the filter-media in place by providing appropriate easily latching and hold mechanisms for the frame cover. The frame can include gaskets to improve the air seal around the perimeter of the filter.

The frame can include magnets on the backside to aid in achieving an air seal along the backside and retaining the filter during an installation where the filter would normally fall out due to gravity. The frame can include pull tabs depending on how the filter is installed making for easy removal of the filter media 100 when compared to needing to pinch a cardboard filter in some alternate prior art implementations.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. An air filter meeting heating ventilation and air conditioning (HVAC) air filter specifications, the air filter comprising:

an air filter media including flat straight border edges on four sides of a filter area of a pleated filter material;

a frame for holding the air filter media, the frame including:

a frame base defined by a pair of straight lengthwise supports and a pair of straight widthwise supports connected to ends of the lengthwise supports, the frame base having a cross support connected to at least one of the widthwise supports or lengthwise supports, the cross support for providing support to the foldable and disposable air filter media, wherein each of the widthwise supports and lengthwise supports each include flat surfaces supporting the flat straight border edges of the filter area;

wherein the cross support positions a differential air pressure sensor in the frame, the differential air pressure sensor configured for monitoring performance of the air filter media when using the air filter media;

wherein the differential air pressure sensor is configured to be powered by a power switch controlled by the air flow for powering the differential air pressure sensor only when using the air filter media; and a frame cover attached to the frame base allowing movement of the frame cover between an open position and a closed position, wherein the frame cover includes a second pair of lengthwise supports with corresponding flat surfaces to the flat surfaces of the lengthwise supports of the frame base and a second pair of widthwise supports with corresponding flat surfaces to the flat surfaces of the widthwise supports of the frame base, wherein the flat surfaces of the lengthwise supports and widthwise supports of the frame base and the flat surfaces of the lengthwise supports and widthwise supports of the frame cover are of a similar size to overlap a border edge at four sides of the air filter media and hold the border edge at the four sides of the air filter media and wherein the flat surfaces of the widthwise and lengthwise supports of the frame base and the flat surfaces of the widthwise and lengthwise supports of the frame cover are aligned with each other to compress the border edges on each of the four sides of the air filter media between the flat surfaces of the frame base and the corresponding flat surfaces of the frame cover to prevent air leaking around the border edges of the air filter media when in the closed position.

2. The air filter of claim 1, wherein edges of the frame cover compressing the border edges of the filter media against the lengthwise and widthwise supports of the frame base provide a seal against air leaking around sides of the air filter media.

3. The air filter of claim 1, wherein the differential air pressure sensor is positioned at the center of the frame on the cross support of the frame base to provide a differential air pressure measurement across the air filter media.

4. The air filter of claim 3, further comprising a filter monitoring system coupled to the differential air pressure sensor, the filter monitoring system operable to determine a baseline differential air pressure when a disposable air filter media is initially installed in the frame and compare the differential air pressure measurement with the baseline value during an air filtering operation of the installed air filter media.

5. The air filter of claim 4, wherein the filter monitoring system is operable to provide an alert if the compared measurement exceeds a threshold indicating the air filter media requires replacement.

6. The air filter of claim 4, wherein the filter monitoring system includes a communication module that allows communication of the differential pressure measurement data to at least a cloud based server enabled to alert a user via external device.

7. The air filter of claim 6, wherein the external device comprises at least a hand held device.

8. The air filter of claim 6, wherein the alert to the user is by one of a push notification or an email.

9. The air filter of claim 4, wherein the filter monitoring system includes an activation button that triggers measurement of the differential baseline air pressure during an initial air flow after replacement of the air filter media.

10. The air filter of claim 1, wherein the power switch includes a paddle actuated by air flow through the air filter and a switch coupled to the paddle, wherein air flow through the air filter actuates the paddle to turn on the switch to enable power to the filter monitoring system when the air filter is operating.

11. The air filter of claim 4, further comprising one or more secondary sensors powered by the power switch, wherein the secondary sensors are one or more of an absolute air pressure sensor, a temperature sensor, a humidity sensor, a volatile organic compound sensor or air quality sensor.

12. The air filter of claim 3, further comprising a lateral support coupled across the base frame.

13. The air filter of claim 4, further comprising an audible indicator or a visual indicator attached to the support to indicate operational and maintenance status of the filter, wherein the visual indicator comprises one or more sets of LEDs, or other displays.

14. The air filter of claim 1, wherein the frame base and the frame cover are held together in the closed position by one or more closure devices that are chosen from a group comprising magnetic closure devices or mechanical closure devices.

15. The air filter of claim 1, wherein the frame cover and the frame base are injection molded.

16. The air filter of claim 1, further comprising one or more hinges connecting the frame cover to the frame base to allow the frame cover to be rotated relative the base frame.

17. The air filter of claim 16, wherein the frame cover includes one or more latching sockets mateable with one or more corresponding latching devices on the frame cover, wherein the latching devices are configured to secure the frame cover on the frame base and hold the frame in the closed position with the filter media enclosed.

18. The air filter of claim 1, wherein the cross support along the length of the frame has a triangular or trapezoidal cross section.

19. The air filter of claim 18, wherein the cross support includes one or more magnet members that magnetically contact one or more magnetized members on the frame cover to hold the frame cover and the frame base closed.

20. The air filter of claim 1, wherein the top cover includes a grid of wires that support and retain the filter media in place wherein the grid of wires is configured to allow all the pleated area of the air filter media to be used for filtering air.

21. The air filter of claim 1, wherein the frame base includes a hexagonal structure to support the air filter media.

22. The frame of claim 1, further comprising a conduit structure insertable into the cross support, the conduit structure having an inlet port aligned to an aperture on a surface of the cross support, an outlet port aligned to an aperture on an opposite surface of cross support, wherein the differential air pressure sensor is positioned in the conduit structure and senses the differential pressure between the inlet port and the outlet port.

23. An air filter comprising:
a foldable and disposable heating ventilation and air conditioning (HVAC) air filter media having a pleated filtration area and border edges on four sides of the air filter media;
a frame base defined by a pair of straight lengthwise supports and a pair of straight widthwise supports connected to ends of the lengthwise supports, the frame base having a cross support connected to at least one of the widthwise supports or lengthwise, the cross support for providing support to the foldable and disposable air filter media; wherein the cross support positions a differential air pressure sensor in the frame, the differential air pressure sensor configured for monitoring performance of the air filter media when using the air filter media and wherein the differential air pressure sensor is configured to be powered by a power switch controlled by the air flow for powering the differential air pressure sensor only when using the air filter media, and wherein each of the widthwise supports and lengthwise supports each include flat surfaces; and
a frame cover attached to the frame base allowing movement of the frame cover between an open position and a closed position, wherein the frame cover includes a pair of lengthwise supports with corresponding flat surfaces to the flat surfaces of the lengthwise supports of the frame base and a pair of widthwise supports with corresponding flat surfaces to the flat surfaces of the widthwise supports of the frame base, wherein the frame base and frame cover are of a size to overlap the border edge seals at the sides of the air filter media and hold the border edges at the four sides of the air filter media and wherein the flat surfaces of the widthwise and lengthwise supports of the frame base and the flat surfaces of the widthwise and lengthwise supports of the frame cover are aligned with each other to compress the border edges on each of the four sides of the air filter media between the flat surfaces of the frame base and the corresponding flat surfaces of the frame cover without air leaking around the border edges of the air filter media when the frame cover is in the closed position.

24. The filter of claim 23, wherein the frame base and frame cover having a rectangular shape that is configured to hold an air filter media confirming to a size per a heating and air conditioning (HVAC) chart; and
wherein the frame base and the frame cover are configured to be closed and securely locked with the air filter media during operation of the air filter in an HVAC system.

25. The filter of claim 23, wherein the air filter further comprises a communication module that allows communication of the differential pressure measurement data to at least a cloud based server enabled to alert a user via wireless to an external device; and
wherein the alert to the user sent wirelessly is using any one of a push notification or an email.

26. The filter of claim 23, wherein the frame cover includes a grid of wires that support and retain the air filter media in place; and wherein the grid of wires are configured to allow almost all the pleated area of the air filter media to be used for filtering air.

* * * * *